(12) United States Patent
Kinder et al.

(10) Patent No.: US 9,706,698 B2
(45) Date of Patent: Jul. 18, 2017

(54) AIR DUCT SHUTOFF

(71) Applicant: AGCO Corporation, Hesston, KS (US)

(72) Inventors: Jared Kinder, Newton, KS (US); Alan R. Morr, Hesston, KS (US); Deborah Honas, Newton, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 14/655,877

(22) PCT Filed: Dec. 18, 2013

(86) PCT No.: PCT/US2013/076057
§ 371 (c)(1),
(2) Date: Jun. 26, 2015

(87) PCT Pub. No.: WO2014/105556
PCT Pub. Date: Jul. 3, 2014

(65) Prior Publication Data
US 2015/0334922 A1    Nov. 26, 2015

Related U.S. Application Data (60) Provisional application No. 61/746,148, filed on Dec. 27, 2012.

(51) Int. Cl.
| A01F 12/48 | (2006.01) |
| A01B 71/08 | (2006.01) |
| A01F 12/44 | (2006.01) |
| A01D 41/12 | (2006.01) |

(52) U.S. Cl.
CPC ............ *A01B 71/08* (2013.01); *A01F 12/444* (2013.01); *A01F 12/446* (2013.01); *A01D 41/1252* (2013.01)

(58) Field of Classification Search
CPC .......................... A01F 12/444; A01F 12/446
USPC .................................. 460/100, 99, 101, 102
See application file for complete search history.

(56) References Cited

U.S. PATENT DOCUMENTS

| 1,050,540 | A | * | 1/1913 | Hohman | F04D 29/462 |
| | | | | | 415/148 |
| 3,664,349 | A | * | 5/1972 | Quick | A01F 12/444 |
| | | | | | 209/136 |
| 3,833,006 | A | * | 9/1974 | Temple | A01F 12/444 |
| | | | | | 415/148 |
| T993,003 | I4 | * | 4/1980 | Kolthoff, Jr. | B07B 11/02 |
| | | | | | 165/86 |
| 4,314,571 | A | | 2/1982 | DeBusscher et al. | |

(Continued)

FOREIGN PATENT DOCUMENTS

GB          869348 A          5/1961

OTHER PUBLICATIONS

US International Searching Authority, International Search Report for International Patent Application No. PCT/2013/076057, mail date of Apr. 24, 2014.

*Primary Examiner* — John G Weiss (57) ABSTRACT

In one embodiment, a method comprising drawing outdoor air past one or more screens of a combine harvester by generating air flow; circulating the air flow through one or more ducts and into a cleaning system of the combine harvester; closing a baffle in each of the one or more ducts; and responsive to the closing, discharging the air flow past the one or more screens.

13 Claims, 9 Drawing Sheets

(56) References Cited

U.S. PATENT DOCUMENTS

| | | | | |
|---|---|---|---|---|
| 5,376,046 A | * | 12/1994 | Shuknecht | A01F 12/444 171/17 |
| 5,624,315 A | * | 4/1997 | Jonckheere | A01F 12/444 460/100 |
| 6,435,965 B2 | | 8/2002 | Visagie | |
| 8,821,229 B2 | * | 9/2014 | Stan | A01F 12/444 460/99 |

* cited by examiner

AIR DUCT SHUTOFF

CROSS REFERENCE TO RELATED APPLICATIONS

This application is a National Stage Application of International Patent Application No. PCT/US2013/076057, filed on Dec. 18, 2013, which claims priority to U.S. provisional application No. 61/746,148, filed Dec. 27, 2012. The full disclosures, in their entireties, of international patent application number PCT/US2013/076057 and U.S. provisional application No. 61/746,148 are hereby incorporated by reference.

TECHNICAL FIELD

The present disclosure is generally related to agriculture technology, and, more particularly, combine harvesters.

BACKGROUND

Combine harvesters are provided with cleaning systems used to remove chaff and other residue from the threshed grain. Within the cleaning system, oscillating sieve assemblies in conjunction with air flow remove the chaff from the threshed grain, the latter falling through the chaffer and sieve assembly to an oscillating clean grain pan. The clean grain pan, in turn, directs the clean grain to a discharge auger that elevates the grain to an onboard storage bin. A second oscillating pan directs materials other than grain over the edge of the bottom sieve assembly to a different discharge outlet for recirculation back through the threshing, separating and cleaning apparatus to extract the previously unthreshed grain. A fan produces an airstream through the chaffer and sieve assembly that entrains the lighter non-grain particles and carries them out the rear of the harvester. The fan draws air from the outside through one or more air intakes, which may lead to crop residue being drawn toward the air intakes as well. For instance, for some crops, such as corn, and under certain conditions, corn leaves may adhere to leaf screens located on the bottom of the combine harvester, resulting in the leaf screen becoming plugged and hampering the cleaning process.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a method comprising drawing outdoor air past one or more screens of a combine harvester by generating air flow; circulating the air flow through one or more ducts and into a cleaning system of the combine harvester; closing a baffle in each of the one or more ducts; and responsive to the closing, discharging the air flow past the one or more screens.

Detailed Description

Certain embodiments of an air duct shutoff system and associated methods are disclosed that remove crop material from one or more leaf screens of a combine harvester. In one embodiment, the air duct shutoff system comprises an air blowing apparatus (e.g., fan or blower) and upper and lower ducts that extend transversely across the combine harvester and with discharge ends that are proximal to an inlet of a cleaning system of the combine harvester. The cleaning system may include those features well known to those having ordinary skill in the art, such as an oscillating sieve assembly (including chaffers). The air blowing apparatus is configured to provide pressurized air through the upper and lower ducts and into the cleaning system to blow the chaff to the rear of the combine harvester. Within the upper duct is a pivotably adjustable baffle. Similarly, within the lower duct is a pivotably adjustable baffle. These baffles are directly connected to a linkage that enables the baffles to be opened and closed simultaneously. In other words, the linkage connects the movement of the baffles. The baffles are adjusted by an actuator (e.g., a choke, etc.), and in one embodiment, simultaneously, to open or close the baffles. The actuator may act on one end of the linkage (e.g., proximal to one of the baffles), wherein the adjustment of one baffle causes the like adjustment of the other baffle via the linkage. In some embodiments, the linkage may be omitted, with an actuator dedicated to each baffle. By opening the baffles, air is permitted to circulate or flow through the ducts and blow the chaff residing in the cleaning system to the rear of the combine harvester. Closing the baffles prohibits, or in some embodiments, severely restricts, the air flowing through the upper and lower ducts. By prohibiting the flow of air through the ducts, the air is redirected and discharged through one or more leaf screens located beneath the combine harvester, effectively removing any crop material that may have been drawn up against the leaf screens during normal operations. Stated otherwise, certain embodiments of the air duct shutoff system block the outlet air of the air blowing apparatus by actuating the baffles (e.g., metal plates) to close off air flow in the upper and lower ducts. When the outlets of the ducts are cut-off, the air provided by the air blowing apparatus is re-directed back toward the leaf screen(s) on the underside of the combine harvester. The redirection of air forcefully removes the crop material (e.g., leaves, stalks, among other biomass) from the leaf screen.

Digressing briefly, crop material may be removed from leaf screens of today's combine harvesters manually or by turning off the machine. Certain embodiments of air duct shutoff systems address the leaf screen blockage without shutting off the combine harvester, hence enabling efficient and productive use of the machine.

Having summarized certain features of air duct shutoff systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on a combine harvester having a transverse-rotor design, though it should be appreciated within the context of the present disclosure that combine harvesters of other designs, such as hybrid, conventional, axial, or dual axial, may be used and hence are contemplated to be within the scope of the present disclosure. Also, though emphasis is placed on embodiments with two ducts, it should be appreciated that certain embodiments may use fewer or additional ducts (or fewer or additional baffles) which may be closed off or opened by an appropriate quantity of baffles. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly.

Figure 1:
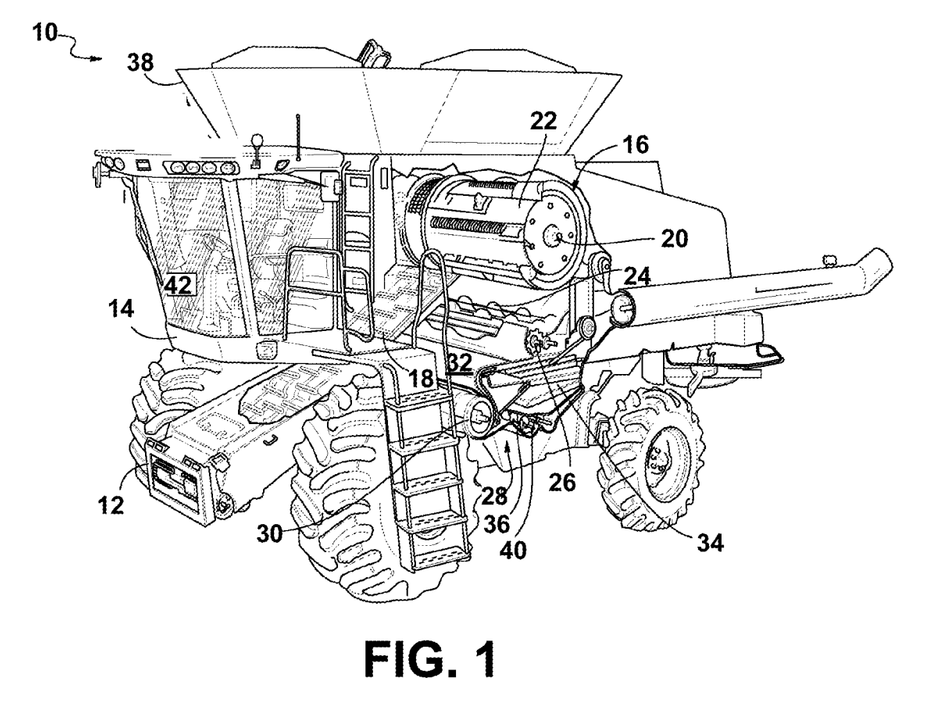
FIG. 1 is a schematic diagram, in partial cutaway view, of an example combine harvester showing an embodiment of an air duct shutoff system.

Referring now to FIG. 1, shown is an example combine harvester 10 in which an embodiment of an air duct shutoff system may be implemented. It should be understood by one having ordinary skill in the art, in the context of the present disclosure, that the example combine harvester 10 shown in FIG. 1 is merely illustrative, and that other combine configurations may be implemented in some embodiments. The example combine harvester 10 is shown in FIG. 1 without a header, and from front to back, comprises a feeder house 12 and an operator cab 14, followed by a processing compartment that includes a processing apparatus 16. In operation, the combine harvester 10 includes a harvesting header (shown in FIG. 2, as described later) at the front of the machine that cuts cop materials and delivers the cut crop materials to the front end of the feeder house 12. Such crop materials are moved upwardly and rearwardly within and beyond the feeder house 12 by a conveyer 18 until reaching a thresher rotor 20 of the processing apparatus 16. The thresher rotor 20 comprises a single, transverse rotor, such as that found in a Gleaner® Super Series Combine by AGCO. The thresher rotor 20 processes the crop materials in known manner and passes a portion of the crop material (e.g., heavier chaff, corn stalks, etc.) toward the rear of the combine harvester 10 and another portion (e.g., grain and possibly light chaff) through a cleaning process, as described below. In some embodiments, such as in axial flow designs, the conveyor 18 may convey the cut crop material to a beater before reaching a rotor or rotors.

In the processing apparatus 16, the crop materials undergo threshing and separating operations. In other words, the crop materials are threshed and separated by the thresher rotor 20 operating in cooperation with certain elements of a rotor cage 22, for instance, well-known foraminous processing members in the form of threshing concave assemblies and separator grate assemblies, with the grain (and possibly light chaff) escaping through the concave assemblies and the grate assemblies and onto one or more distribution augers 24 located beneath the processing apparatus 16. Bulkier stalk and leaf materials are generally retained by the concave assemblies and the grate assemblies and are disbursed out from the processing apparatus 16 and ultimately out of the rear of the combine harvester 10. The distribution augers 24 uniformly spread the crop material that falls upon it, with the spread crop material conveyed to accelerator rolls 26. The accelerator rolls 26 speed the descent of the crop material toward a cleaning system 28. Also shown is a transverse, air blowing apparatus 30 (e.g., fan, or equivalently, a blower), which discharges pressurized air through one or more ducts, such as ducts 32 (e.g., which in one embodiment, includes an upper duct and lower duct, as explained below, though not limited to two ducts) to the cleaning system 28 to facilitate the cleaning of the heavier crop material directly beneath the accelerator rolls 26 while causing the chaff to be carried out of the rear of the combine harvester 10. The ducts 32 include baffles that open and close to permit or prevent (or significantly limit) the flow of air to the cleaning system 28, as explained below. The cleaning system 28 includes plural stacked sieves 34 (e.g., also referred to herein as an oscillating sieve assembly), through which the fan 30 provides an additional push or influence (through a lower duct 32, as explained below) of the chaff flow to the rear of the combine harvester 10. The cleaned grain that drops to the bottom of the cleaning system 28 is delivered by an auger 36 that transports the grain to a well-known elevator mechanism (not shown), which conveys the grain to a grain bin 38 located at the top of the combine harvester 10. Any remaining chaff and partially or unthreshed grain is recirculated through the processing apparatus 16 via a tailings return auger 40. As combine processing is known to those having ordinary skill in the art, further discussion of the same is omitted here for brevity.

The example combine harvester 10 also comprises a controller 42 (shown schematically). Though depicted in the operator cab 14, the controller 42 may be located elsewhere on the combine harvester 10 in some embodiments. In some embodiments, the controller 42 may control the opening and closing of baffles located in the ducts 32. Such control may be based on operator input and/or a change in one or more machine parameters, such as a change in direction of the combine harvester 10, a change in header height, a change in speed, among other machine parameters.

Figure 2:
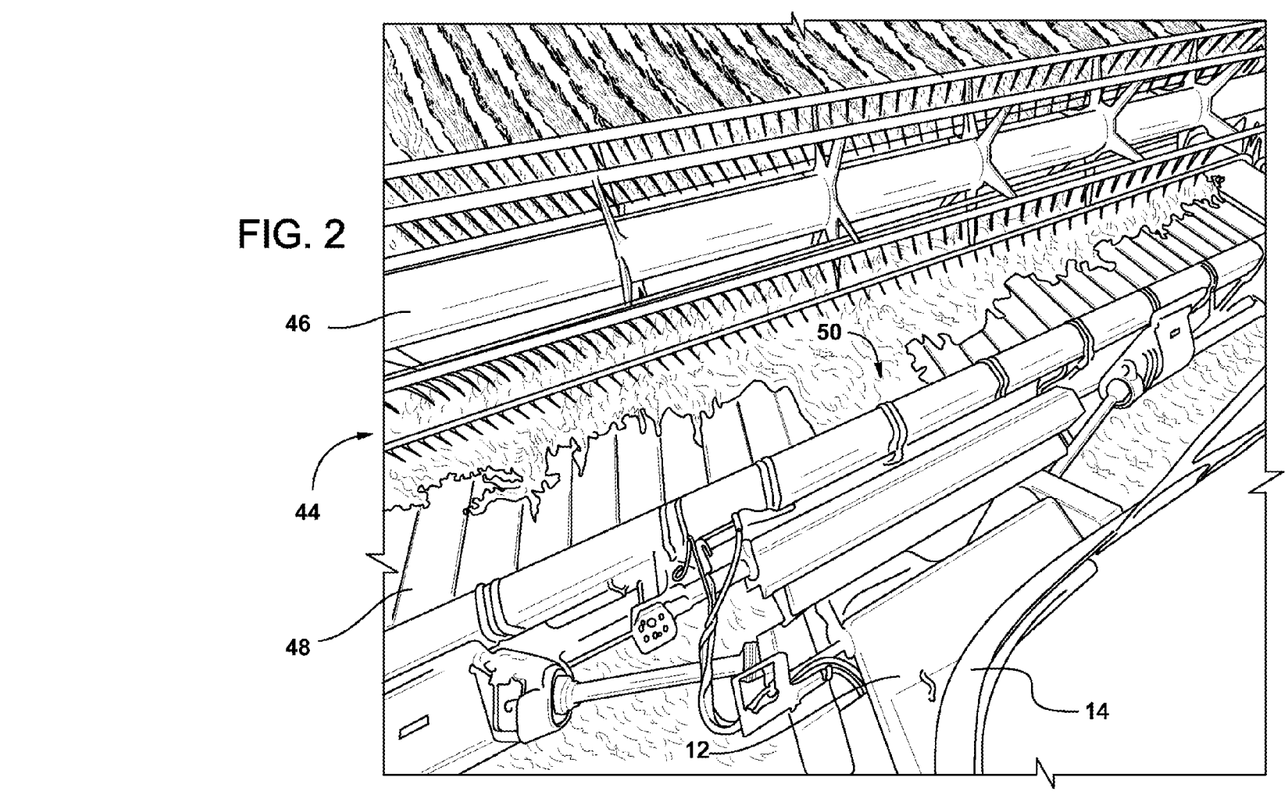
FIG. 2 is a schematic diagram in a top perspective view of an example combine harvester showing a header with a parameter that may be used in a control arrangement involving an embodiment of an air duct shutoff system.

FIG. 2 shows a top-down view from a location proximal to the top of the operator cab 14. As shown, the feeder house 12 has secured to it a header 44, shown partially in FIG. 2, which may be removed and replaced with other types of headers depending on the application. Although shown as a draper style header, other types of headers may be used, such as pickup headers, corn headers, etc. In one embodiment, the header 44 comprises a cutting portion 46 for cutting the crops and a transition portion 48 that conveys (e.g., using a conveyor, such as a belt or belts, chain and slat configuration, etc.) the cut crops toward a rear, center portion 50 of the header 44, as is known. The center portion 50 may comprise a feeder auger (not shown) to advance the harvested crop material into the feeder house 12, where the conveyor 18 (FIG. 1) conveys the crop material toward the processing apparatus 16. As explained above, the raising of the header 44, such as at a headlands when the combine harvester 10 (FIG. 1) turns around to harvest the next row(s) of crop material (e.g., corn rows), may be detected (e.g., by a positional sensor) and a corresponding signal fed to the controller 42 (or other device, such as an actuator). The controller 42 may send a signal to an actuator associated with the baffles in the ducts 32 to close (e.g., after a cleaning system purge) the baffles, enabling the redirection and subsequent discharge of pressurized air from the air blowing apparatus past one or more leaf screens of the combine harvester to remove any crop material adhering to the leaf screens.

Figure 3:
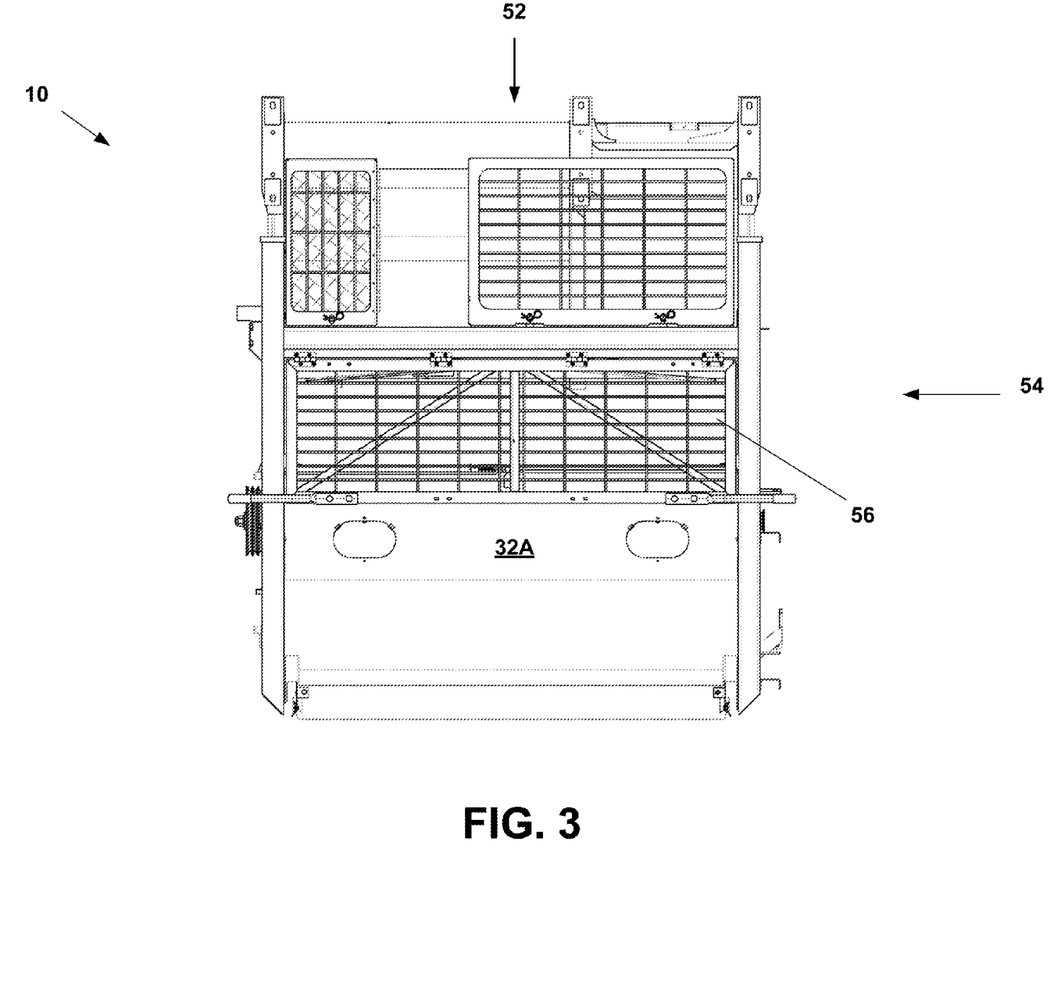
FIG. 3 is a bottom, fragmentary view of a portion of a combine harvester showing a leaf screen and a duct in which at least a portion of an embodiment of an air duct shutoff system is implemented.

Referring now to FIG. 3, shown is a bottom, fragmentary view of a portion of the combine harvester 10. For instance, the orientation shown includes a front portion 52 and a left portion 54 of the combine harvester 10. Also shown is a lower duct 32A, which spans transversely across the combine harvester 10 proximal to a leaf screen 56. In one embodiment, the leaf screen 56 is segregated into separate hinged sections that may be independently opened, and in some embodiments, the leaf screen 56 may be a single hinged section (or unhinged in some embodiments). There may be additional leaf screens on the underside of the combine harvester 10 or elsewhere (e.g., on the side of the machine) in some embodiments. One problem addressed by certain embodiments of an air duct shutoff system is that of removing crop material that adheres to the screen 56 due to the crop material being drawn against the screen 56 by operation of the air blowing apparatus 30 (FIG. 1).

Figure 4A:
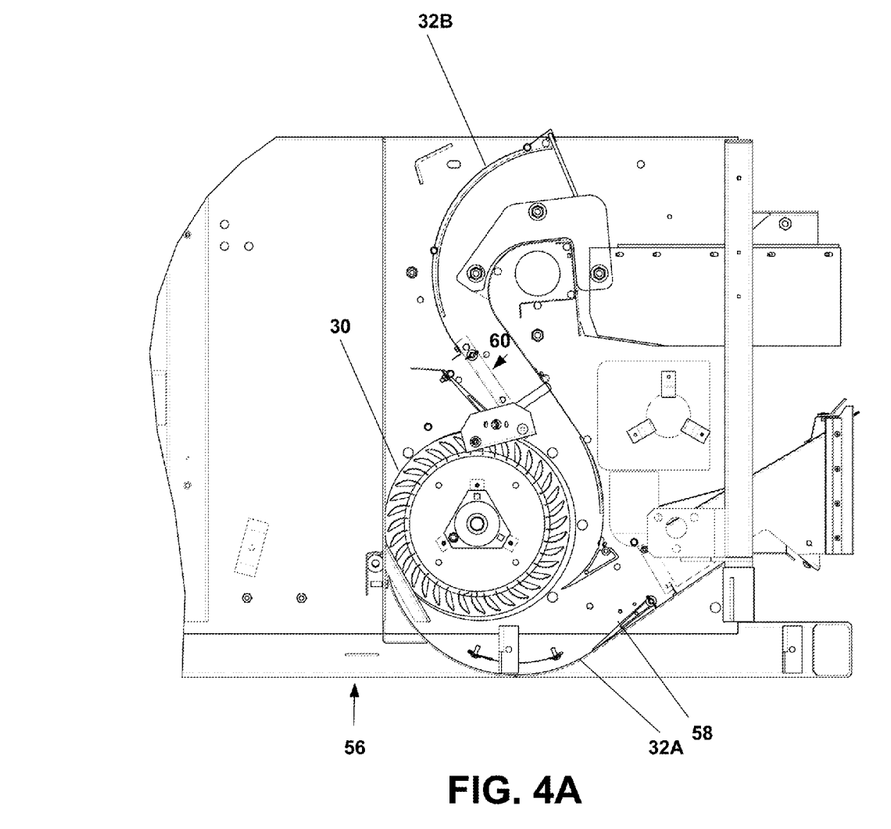
FIG. 4A is a schematic diagram, in a fragmentary, left side elevation view, of an embodiment of an air duct shutoff system in an open duct state.
Figure 4B:
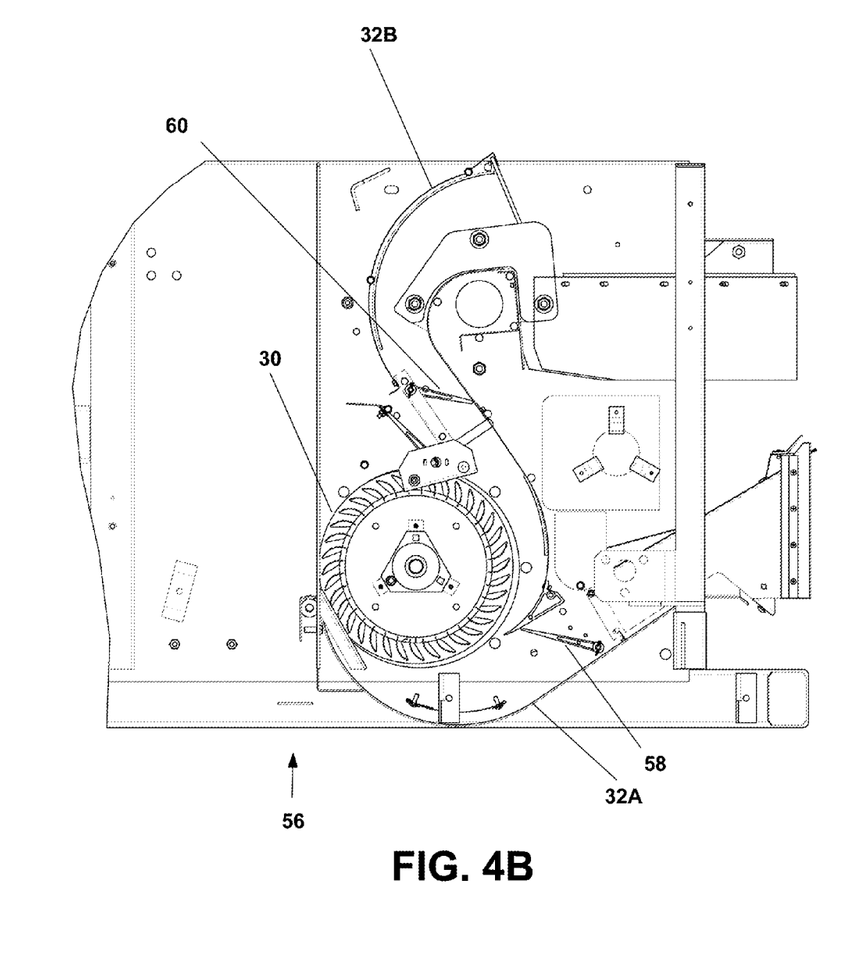
FIG. 4B is a schematic diagram, in a fragmentary, left side elevation view, of an embodiment of an air duct shutoff system in closed duct state.

Turning attention now to FIGS. 4A-4B, shown are fragmentary, side elevation views (e.g., left side of the combine harvester 10, FIG. 1) of an embodiment of an air duct shutoff system comprising the air blowing apparatus 30, the ducts 32 (e.g., 32A, 32B), baffles 58 and 60, and the leaf screen 56. It should be appreciated within the context of the present disclosure that other configurations may be used and hence are contemplated to be within the scope of the disclosure, such as different locations for the baffles 58 and 60, different pivoting locations, among other variations. The baffle 58 is disposed in the lower duct 32A, proximal to the location of the air blowing apparatus 30. The baffle 60 is disposed in the upper duct 32B, proximal to the air blowing apparatus 30. In one embodiment, the baffle 58 is pivotally secured to the lower interior surface of the lower duct 32A, and the baffle 60 is pivotally secured to the upper interior surface of upper duct 32B. In one embodiment, the baffles 58 and 60 are linked together, as described below, enabling simultaneous opening and closing of the baffles 58 and 60. In the configuration shown in FIG. 4A, the baffles 58 and 60 are in an open configuration (e.g., open duct state), enabling the air discharged from the air blowing apparatus 30 to be directed through the upper duct 32B and the lower duct 32A and discharged to the cleaning system 28, which may include the oscillating sieve assemblies 34 of the cleaning shoe. The air discharged from the upper duct 32B is supplemented by the air discharged from the lower duct 32A, the latter flowing through the oscillating sieve assemblies 34 and joining with the air flow from the upper duct 32B.

Referring to FIG. 4B, the configuration or position of the baffles 58 and 60 has been adjusted (e.g., simultaneously), resulting in a pivoting of the baffles 58 and 60 to a closed configuration (e.g., closed duct state). In other words, the baffles 58 and 60 pivot to extend across opposing interior sides of the lower duct 32A and upper duct 32B, respectively, sealing the ducts shut. In some embodiments, an insignificant amount of air is permitted to leak past the baffles 58 and 60. The air blowing apparatus 30, in the meantime, continues to rotate to generate pressurized air, yet due to the closure of the baffles 58 and 60, the air is prohibited from flowing through the lower and upper ducts 32. Instead, the air flow is redirected to the leaf screen 56, discharging through the leaf screen and removing any crop material adhering to the leaf screen 56 in the process.

Note that in some embodiments, the opening and closing of the baffles 58 and 60 may be directly and continuously controlled, and in some embodiments, the control may be direct and continuous in only a single direction. For instance, the closing of the baffles 58 and 60 may be signaled (e.g., applying (or removing) a given hydraulic pressure (or voltage or current in some embodiments) to an actuator over an extend period), whereas the opening is a timed-delay, biased release (e.g., time-delayed spring action) where after a defined amount of time (e.g., corresponding to a programmed air discharge duration through the leaf screen 56), the baffles 58 and 60 automatically open. These and other variations in achieving the opening and closing of the baffles to serve the function of removing crop material from the leaf screen 56 may be implemented, and hence are contemplated to be within the scope of the disclosure.

Figure 5:
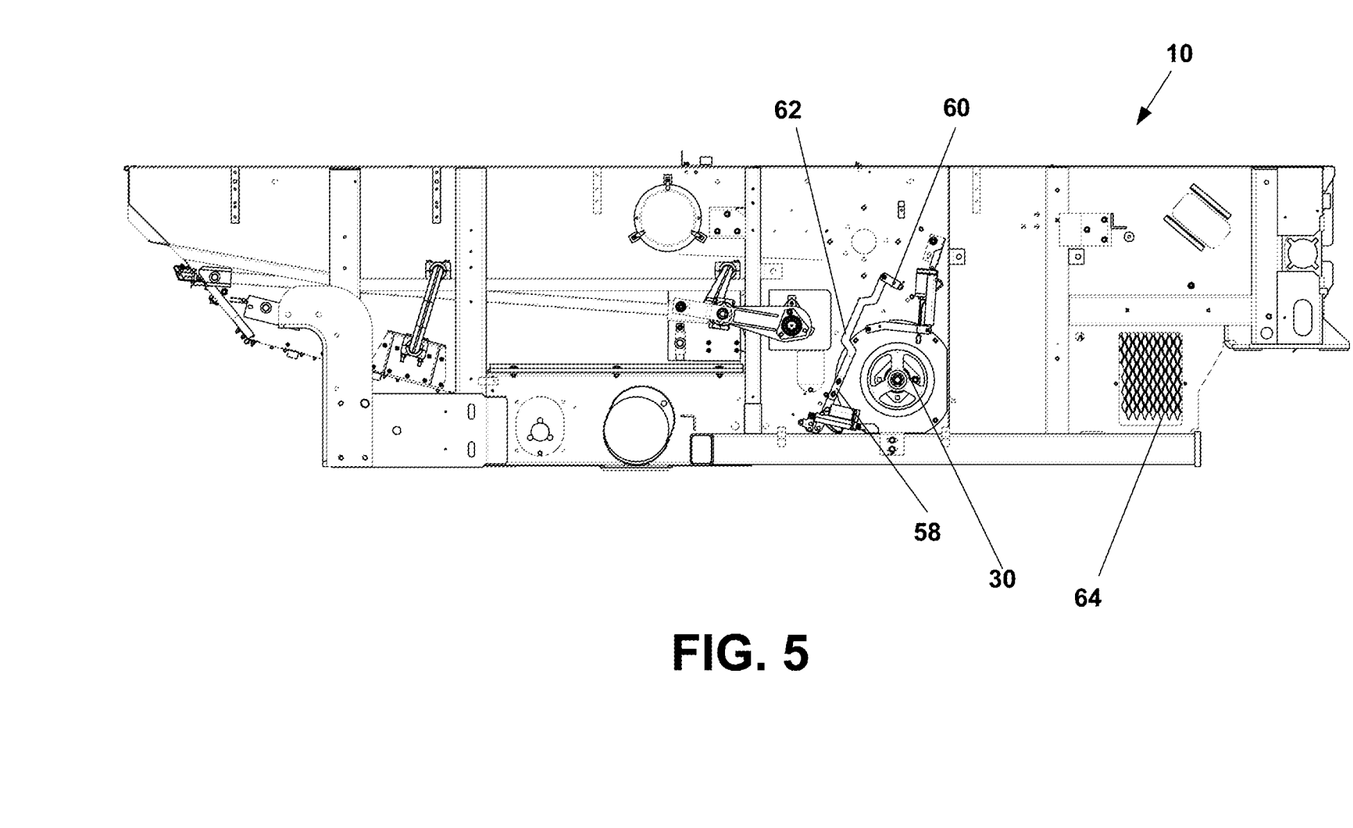
FIG. 5 is a schematic diagram in right side elevation view of a linkage connecting the movement of plural baffles of an embodiment of an air duct shutoff system.

Referring to FIG. 5, shown is a fragmentary, side elevation (e.g., right side) view of the combine harvester 10 showing a linkage 62 that connects the baffles 58 and 60, enabling simultaneous opening and closing of the baffles 58 and 60. It should be appreciated that certain features are omitted, such as the ducts 32, to avoid obfuscating certain relevant features of an embodiment of an air duct shutoff system. Also shown is the air blowing apparatus 30, which is as described above. Note also the depiction of a forwardly, side-mounted leaf screen 64, which may enable the ingress of air to facilitate the redirection and discharge of air past the leaf screens 56 (FIGS. 4A and 4B) when the baffles 58 and 60 are closed.

Figure 6A:
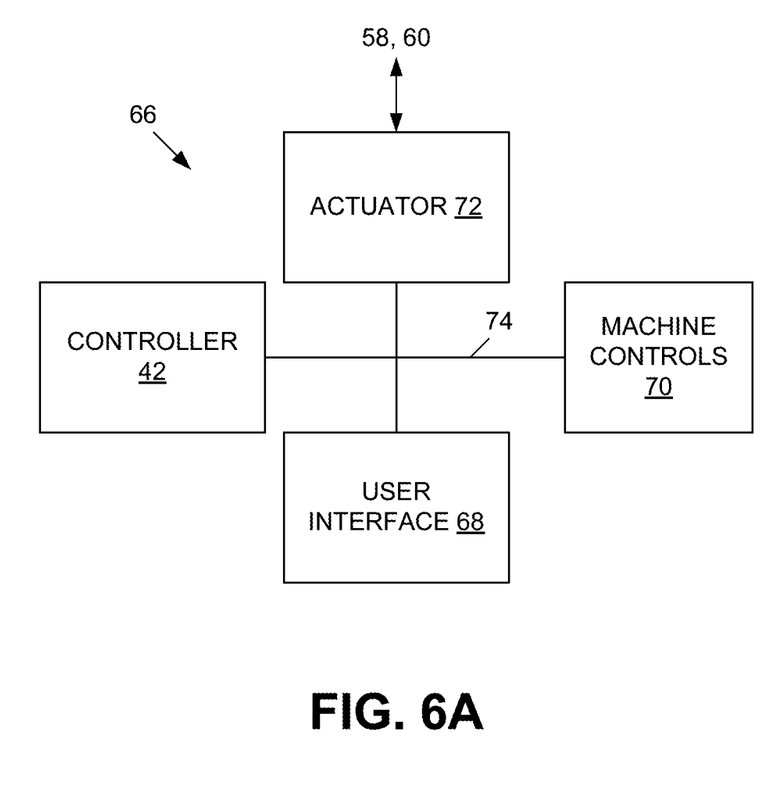
FIGS. 6A-6B are block diagrams that illustrates an embodiment of an air duct shutoff system with controls.

FIG. 6A shows an embodiment of a control system 66 for an embodiment of an air duct shutoff system. It should be appreciated within the context of the present disclosure that some embodiments may include additional components or fewer or different components, and that the example depicted in FIG. 6A is merely illustrative of one embodiment among others. For instance, a global positioning device (or like system) may be part of the control system 66. The control system 66 includes the controller 42, a user interface 68, machine controls 70, and an actuator 72 coupled to each other via a network 74. For instance, the controller 42 may be coupled in a CAN network 74 (though not limited to a CAN network or a single network) to the user interface 68, machine controls 70, and the actuator 72. The machine controls 70 collectively comprise the various actuators, sensors, and/or controlled devices residing on the combine harvester 10 (FIG. 1), including those used to control machine navigation (e.g., speed, direction, etc.), internal machinery operations (e.g., for processing system adjustments, cleaning system adjustments, etc.), header position and/or control, among others. The user interface 68 may be a keyboard, mouse, microphone, touch-type display device, or other devices (e.g., switches) that enable input by an operator (e.g., such as while in the operator cab 14 (FIG. 1)). The actuator 72 may be embodied as a choke, among other types of actuating devices based on electric, hydraulic, mechanical, and/or pneumatic motive forces, to cause the opening and closing of the baffles 58 and 60. In some embodiments, the controller 42 provides for the overall management and control of the control system 66, and in some embodiments, two or more of the components (e.g., the actuator 72 and the machine controls 70) may communicate with each other (e.g., in peer-to-peer relationship) without intervention by the controller 42. In some embodiments, operator intervention may be implemented in whole, or in part, or none at all. For instance, the operator may be apprised of a given impending action, providing an opportunity to override the system 66, or in some embodiments, machine actions may require operator approval, and in some embodiments, feedback of an executed action may be provided to the operator via the user interface 68. In some embodiments, one or more actions may occur transparently to the operator.

In one embodiment, the controller 42 receives and processes one or more parameters (including changes thereof) or other information from the machine controls 70, such as a height change of a given threshold (or an absolute height), and responsively, signals the actuator to close the baffles 58 and 60, which redirects the air flow to cause a discharge of the redirected air through the leaf screen 56 (e.g., to remove crop material adhering or otherwise in contact with the leaf screen 56). In some embodiments, the parameter change may result in signaling directly to the actuator 72, enabling the position adjustment (e.g., opening and/or closing) of the baffles 58 and 60. In some embodiments, the operator may activate (e.g., directly or indirectly) a device on the user interface 68 (e.g., a switch, a display icon, verbal instruction), causing the position adjustment of the baffles 58 and 60. A combination of any two or more of these actions may be implemented in some embodiments. Further, other parameter changes may prompt the position adjustment of the baffles 58 and 60, such as a directional change (e.g., as detected by a global position system or steering sensor, etc.) by the combine harvester 10 (FIG. 1) beyond a threshold turn ratio, or a combination of a threshold turn ratio and speed change. In some embodiments, the header height may be combined with other parameters before the actuator 72 is activated.

In some embodiments, an external communication may enable the position adjustment of the baffles 58 and 60, such as a remote control from a management office (e.g., in autonomous farming implementations) or via an electronic device in the field that signals certain field markers of significance, such as a headlands. Note that signaling may be achieved over the wired network 74, or wirelessly in some embodiments.

Figure 6B:
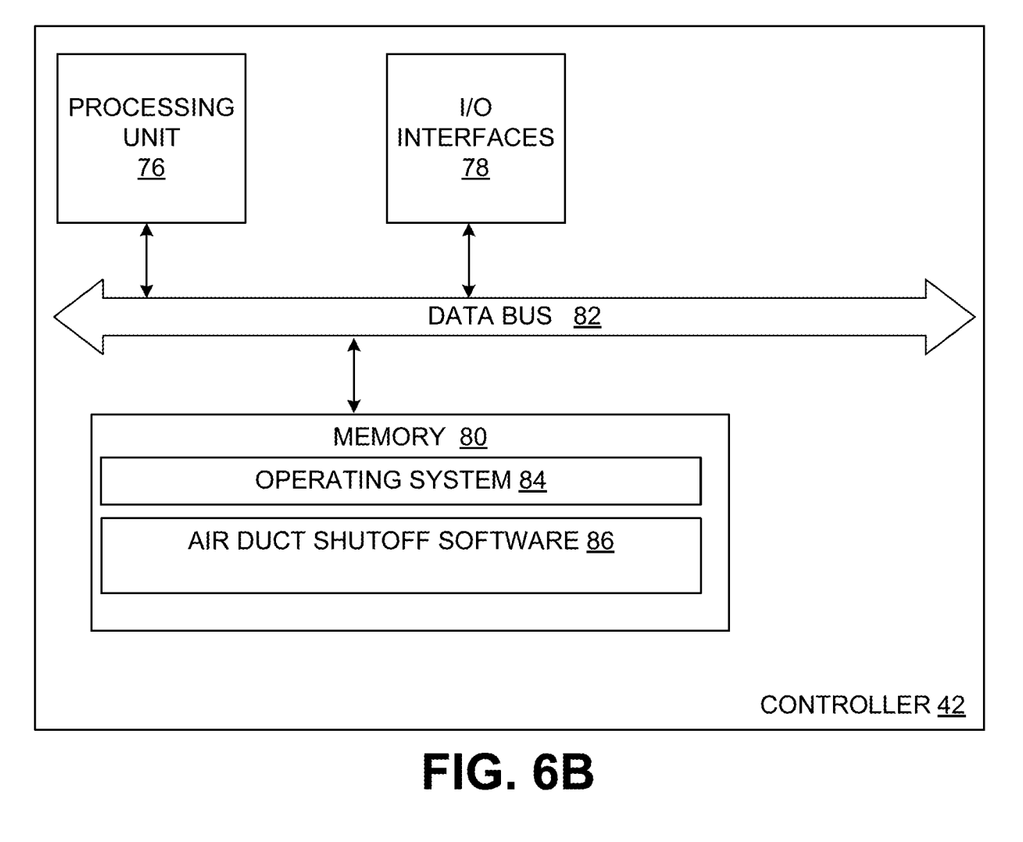

FIG. 6B further illustrates an example embodiment of the controller 42. One having ordinary skill in the art should appreciate in the context of the present disclosure that the example controller 42 is merely illustrative, and that some embodiments of controllers may comprise fewer or additional components, and/or some of the functionality associated with the various components depicted in FIG. 6B may be combined, or further distributed among additional modules, in some embodiments. The controller 42 is depicted in this example as a computer system, but may be embodied as a programmable logic controller (PLC), FPGA, among other devices. It should be appreciated that certain well-known components of computer systems are omitted here to avoid obfuscating relevant features of the controller 42. In one embodiment, the controller 42 comprises one or more processing units, such as processing unit 76, input/output (I/O) interface(s) 78, and memory 80, all coupled to one or more data busses, such as data bus 82. The memory 80 may include any one or a combination of volatile memory elements (e.g., random-access memory RAM, such as DRAM, and SRAM, etc.) and nonvolatile memory elements (e.g., ROM, hard drive, tape, CDROM, etc.). The memory 80 may store a native operating system, one or more native applications, emulation systems, or emulated applications for any of a variety of operating systems and/or emulated hardware platforms, emulated operating systems, etc. In the embodiment depicted in FIG. 6B, the memory 80 comprises an operating system 84 and air duct shutoff software 86. It should be appreciated that in some embodiments, additional or fewer software modules (e.g., combined functionality) may be employed in the memory 80 or additional memory. In some embodiments, a separate storage device may be coupled to the data bus 82, such as a persistent memory (e.g., optical, magnetic, and/or semiconductor memory and associated drives).

The air duct shutoff software 86 receives information (e.g., a parameter(s) change) from one or more of the machine controls 70 (FIG. 6A), and causes a signal to be provided via the I/O interface 78 to the actuator 72 over the network 74. It should be appreciated that other machine operation software may be included in the memory 80 in some embodiments.

Execution of the air duct shutoff software 86 is implemented by the processing unit 76 under the management and/or control of the operating system 84. In some embodiments, the operating system 80 may be omitted and a more rudimentary manner of control implemented. The processing unit 76 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 42.

The I/O interfaces 78 provide one or more interfaces to the network 74 (FIG. 6A) and other networks. In other words, the I/O interfaces 78 may comprise any number of interfaces for the input and output of signals (e.g., analog or digital data) for conveyance over the network 74. The input may comprise input by an operator (local or remote) through the user interface 68 (e.g., a keyboard or mouse or other input device (or audible input in some embodiments)), and input from signals carrying information from one or more of the components of the combine harvester 10 (FIG. 1), such as machine controls 70 (FIG. 6A), among other devices.

When certain embodiments of the controller 42 are implemented at least in part as software (including firmware), as depicted in FIG. 6B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 42 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
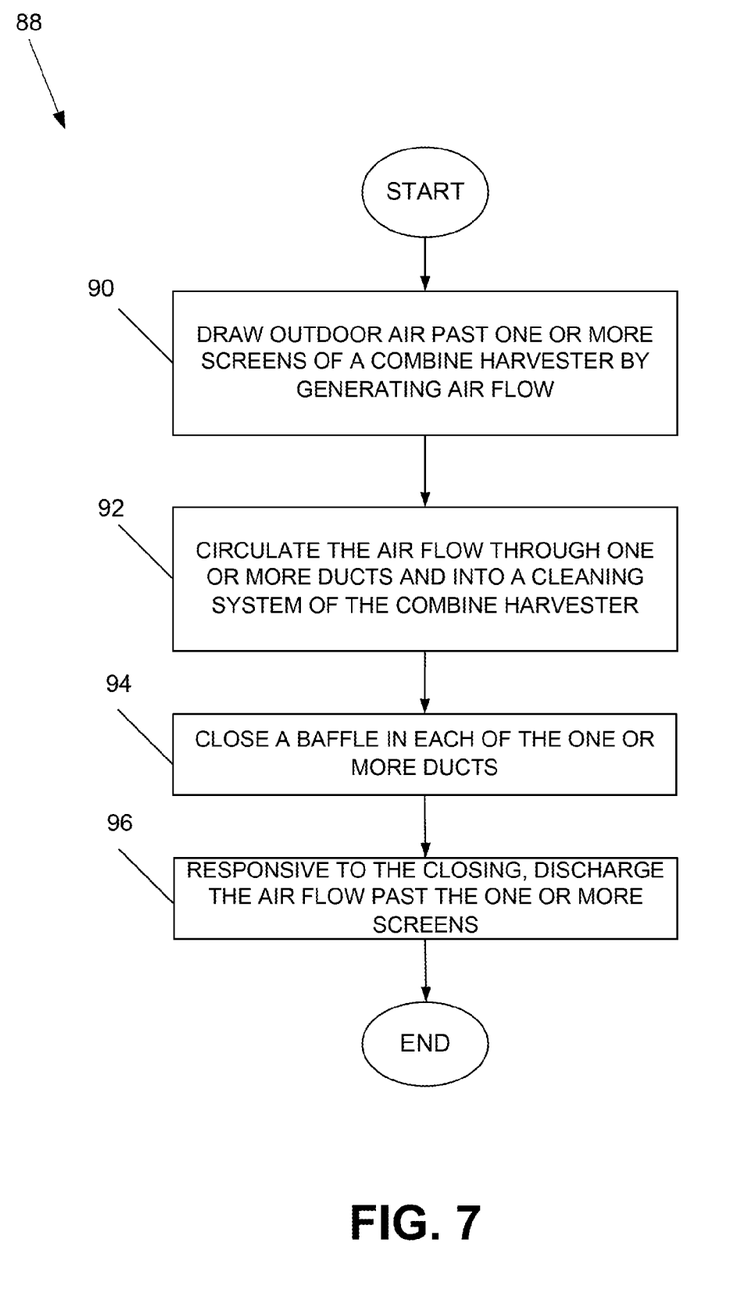
FIG. 7 is a flow diagram that illustrates an example embodiment of an air duct shutoff method.

Having described certain embodiments of an air duct shutoff system, it should be appreciated within the context of the present disclosure that one embodiment of an air duct shutoff method, denoted as method 88 as illustrated in FIG. 7, comprises drawing outdoor air past one or more screens of a combine harvester by generating air flow (90); circulating the air flow through one or more ducts and into a cleaning system of the combine harvester (92); closing a baffle in each of the one or more ducts (94); and responsive to the closing, discharging the air flow past the one or more screens (96).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method, comprising:
   drawing outdoor air past a bottom-mounted leaf screen and a side-mounted leaf screen of a combine harvester into an air blowing apparatus thereby generating an air flow;
   circulating the air flow through one or more ducts and into a cleaning system of the combine harvester;
   closing a baffle in each of the one or more ducts; and
   responsive to the closing, discharging the air flow past the bottom-mounted leaf screen.

2. The method of claim 1, wherein drawing the outdoor air further comprises drawing crop material from the ground, the crop material remaining against the bottom-mounted leaf screen.

3. The method of claim 2, wherein discharging the air flow comprises causing the crop material to be removed from the bottom-mounted leaf screen.

4. The method of claim 1, wherein for plural ducts, closing the baffle in each of the plural ducts comprises closing all of the baffles simultaneously.

5. The method of claim 1, wherein for plural ducts, circulating the air flow comprises circulating the air flow in a top duct and a bottom duct, the top and bottom ducts each having a discharge end that is proximal to oscillating sieve assemblies of the cleaning system.

6. The method of claim 1, further comprising detecting a change in a mechanical parameter of the combine harvester, and responsive to the change, closing the baffle in each of the one or more ducts.

7. A combine harvester, comprising:
   a bottom-mounted leaf screen disposed at an underside of the combine harvester;
   a side-mounted leaf screen disposed at a side of the combine harvester;
   a cleaning system;
   an upper air duct;
   a lower air duct, wherein the upper and lower air ducts comprise a respective discharge end that is proximal to an inlet to the cleaning system;
   an air blowing apparatus configured to discharge air through the upper and lower ducts and into the cleaning system; and
   first and second baffles disposed within the upper and lower air ducts, respectively, the first and second baffles pivotably adjustable to permit and prohibit air flow in the upper and lower ducts;
   wherein the air blowing apparatus is configured to draw outdoor air past the bottom-mounted leaf screen when the first and second baffles are each in an open position that permits air flow in the upper and lower ducts, and
   wherein the air blowing apparatus is configured to draw outdoor air past the side-mounted leaf screen and to discharge air past the bottom-mounted leaf screen when the first and second baffles are each in a closed position that prohibits air flow in the upper and lower ducts.

8. The combine harvester of claim 7, further comprising a linkage that connects the movement of the first and second baffles and an actuator, the actuator operably coupled to the linkage to adjust the respective position of the first and second baffles.

9. The combine harvester of claim 8, wherein the actuator is configured to adjust by opening the first and second baffles simultaneously and closing the first and second baffles simultaneously.

10. The combine harvester of claim 8, further comprising a controller operably coupled to the actuator, the controller configured to cause the actuator to adjust the respective position of the first and second baffles.

11. The combine harvester of claim 8, wherein the actuator is configured to adjust the respective position of the first and second baffles responsive to a change in a machine parameter.

12. The combine harvester of claim 7, wherein the cleaning system comprises an oscillating sieve assembly.

13. The combine harvester of claim 7, wherein the air blowing apparatus comprises a fan.

* * * * *